United States Patent [19]

Barton

[11] 4,263,539

[45] Apr. 21, 1981

[54] AUTOMATIC ANTENNA POSITIONING APPARATUS

[75] Inventor: Stephen Barton, Cupertino, Calif.

[73] Assignee: Zenith Radio Corporation, Glenview, Ill.

[21] Appl. No.: 839,252

[22] Filed: Oct. 4, 1977

[51] Int. Cl.[2] .............................................. G05B 1/06

[52] U.S. Cl. .................................... 318/664; 318/663; 318/672; 318/673; 318/447; 343/100 AD

[58] Field of Search ............... 318/663, 664, 672, 673, 318/621, 447; 343/100 AD

[56] References Cited

U.S. PATENT DOCUMENTS

| | | | |
|---|---|---|---|
| 2,559,339 | 7/1951 | Blease et al. | 343/100 AD |
| 2,704,815 | 3/1955 | Guiles | 318/621 |
| 2,794,162 | 5/1957 | Lifsey | 318/673 |
| 2,989,680 | 6/1961 | Weiser et al. | 318/467 |
| 3,200,314 | 8/1965 | Iroler | 318/33 |
| 3,229,176 | 1/1966 | Curll, Jr. et al. | 318/16 |
| 3,248,730 | 4/1966 | Neumeyer | 343/100 |
| 3,437,894 | 4/1969 | Pohl | 318/162 |
| 3,448,360 | 6/1969 | Pohl | 318/28 |
| 3,614,574 | 10/1971 | Hodges et al. | 318/467 |
| 3,826,964 | 7/1974 | Byrne | 318/664 |
| 4,077,000 | 2/1978 | Grubbs | 318/672 |

OTHER PUBLICATIONS

"Owner's Manual Cornell-Dubilier Electronics Model AR-40 Solid State Automatic Antenna Rotor System", #508 52-00, Issue E 7/74.

*Primary Examiner*—J. V. Truhe

*Assistant Examiner*—Eugene E. Indyk

[57] ABSTRACT

Apparatus for rotating an antenna to a predetermined position and maintaining said position is disclosed. The system comprises an antenna position sensing signal source, a desired position signal source, both of which provide analog signals, position comparator means, and antenna drive means. Comparison of the desired position signal and actual position signal generates a direction relay signal and an antenna rotor drive relay signal which together activate the antenna rotor drive means for rotation in the proper direction to the desired position. Circuitry is included for automatic operation in conjunction with equipment utilizing predetermined channels, such as a radio or television receiver, and for manual override or testing and calibration of the automatic operation.

12 Claims, 2 Drawing Figures

AUTOMATIC ANTENNA POSITIONING APPARATUS

BACKGROUND OF THE INVENTION

This invention relates generally to a system for rotating an antenna shaft to a predetermined position and maintaining said position. Devices of this nature are particularly suited and desirable for positioning directional antennas in order to maximize the desired signal strength and minimize undesired stray signals, noise, and reflected signals. For instance, to achieve reception of television signals of maximum strength, it is desirable that the main signal strength lobe of a directional receiving antenna be aligned along a straight line to the transmitting antenna and pointed at the transmitting antenna. Further, since television receivers are often capable of receiving signals from a multitude of stations, it is desirable that one have the ability to rotate the receiving antenna to the optimum position with respect to the chosen transmitting antenna. It is also desirable that antenna rotation be accomplished automatically and without personal attention in conjunction with the selection of a particular channel on a television or radio.

The orientation of the receiving antenna is a critical factor in optimizing the reception of television broadcast signals. Antenna rotors are particularly useful in areas where transmitting antennas are located in different directions with respect to a receiving antenna. Since television receivers are capable of receiving many different channels, it is especially desirable that the rotor system accurately and repeatedly position the antenna in the chosen direction in order to maximize the strength of the desired signal.

It is further desirable that the antenna rotor automatically rotate the antenna to the optimum direction upon the selection of the desired channel without making intermediate stops. The automatic rotation allows repeated operation without personal attention and the lack of intermediate stops provides for rapid antenna positioning. However, in many instances it is also necesssary that rotation be restricted in such a manner as to avoid a series of rotations in the same direction which might otherwise cause the antenna lead in wires to become wrapped around the rotor shaft and chafe or break. By automatically determining the direction of rotation, based upon a comparison of a signal representing the desired position and a signal representing the actual position prior to the energization of the rotator, one may restrict rotation as desired, avoid lead-in wire damage and still position the antenna quickly.

In light of these desirable properties for an antenna rotor system, one must also design the system for ease of attachment and operation with existing radio and television receivers. In systems utilizing predetermined channels such as television, the antenna rotor system disclosed herein may be interfaced with the channel selector to automatically position the antenna in response to channel selection.

The prior art is typified by rotor systems utilizing complex digital systems involving shift registers, memories, analog-digital converters, etc. These are designed to rotate an antenna at high speed with varying maximum drive rates and with no restrictions on the degree or direction of rotation. See for instance U.S. Pat. Nos. 3,448,360 issued to J. E. Pohl; 3,437,894 issued to J. E. Pohl; and 3,826,964 issued to F. Byrne. Systems of this nature are found, for example, in radar installations where the antenna position is constantly sensed and adjusted as quickly as possible to follow a moving object. Less sophisticated rotor systems are characterized by a proliferation of relays and switches used in conjunction with a manual control box incorporating mechanical, rather than electrical, position sensing, indicating, and control devices. These have often proven to be unreliable due to mechanical failures.

SUMMARY OF THE INVENTION

The invention comprises a system for rotating an antenna to a predetermined angular position. The system includes a rotor drive motor for angularly positioning the antenna shaft. A signal representing the actual position of the antenna is generated for comparison with a signal representing the desired position. A position comparator compares these two signals annd produces a position comparator signal which is fed to a direction control means to determine in which direction the antenna shaft should be rotated. A start pulse generator provides a start pulse in response to the selection of a desired rotor position, and this start pulse and the position comparator signal are both fed to a rotor power signal means to energize the rotor for rotation of the antenna in the direction determined by the direction control means until the actual position of the antenna rotor coincides with the desired position.

Accordingly, it is a general object of the invention to provide an improved system for rotating an antenna shaft to a predetermined angular position in response to the selection of a desired position.

It is another object of this invention to provide a reliable and inexpensive system for accomplishing said antenna rotation which also provides ease of operation.

It is another object of this invention to provide apparatus for controlling the rotation of an antenna wherein the selection of the desired position is accomplished simultaneously and automatically in conjunction with the selection of a predetermined channel on an associated radio or television apparatus.

It is another object of this invention to provide apparatus for controlling the rotation of an antenna wherein the antenna is automatically rotated to the desired position in response to the selection of a desired position without intermediate stops.

It is another object of this invention to provide apparatus for controlling the rotation of an antenna wherein rotation constraints may be placed upon the system to prevent excessive rotation in one direction, so as to prevent damage to collateral equipment, such as lead-in wires.

It is another object of the invention to provide apparatus for controlling the rotation of a television receiving antenna which is compatible with existing television receivers and easily interfaces therewith.

DESCRIPTION OF THE PREFERRED EMBODIMENT

As will be apparent to one skilled in the art, it should be noted that the apparatus disclosed herein is capable of numerous applications where rotary antenna positioning is necessary or desirable; specific description of the embodiment disclosed herein is intended to be illustrative and not restrictive.

Also, it will be apparent to one skilled in the art of electrical logic circuits that the specified "high" and "low" states, as well as the selection of specific electrical or electronic devices, are illustrative of only particular embodiments for which there may be several alternatives.

Figure 1:
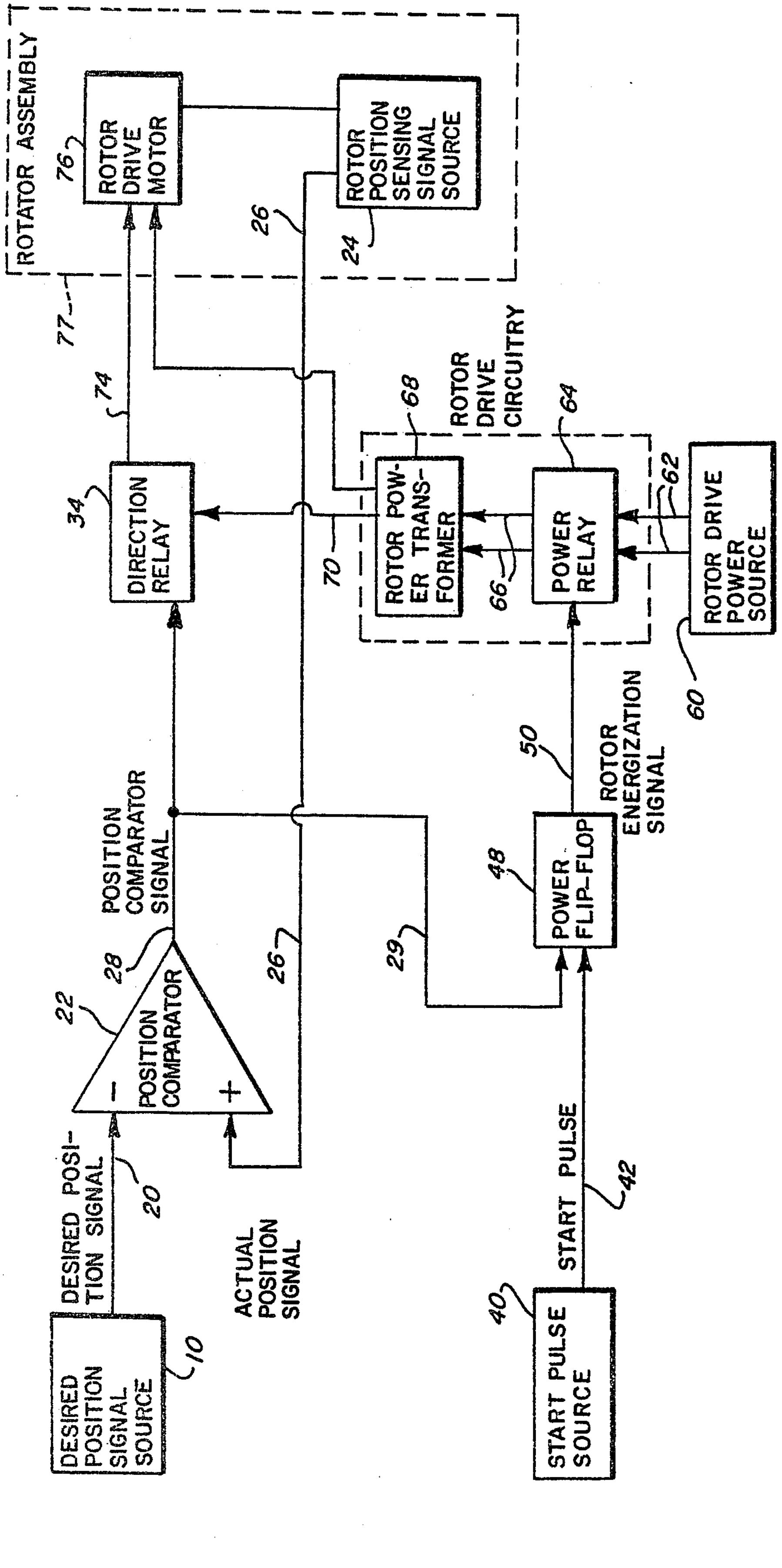
FIG. 1 is a block diagram disclosing an automatic antenna positioning system for rotating a television receiving antenna to a preselected desired position.

Referring to FIG. 1, there is illustrated a block diagram of an automatic television receiving antenna positioning system. A desired position signal source 10, in response to either a manual adjustment or a preprogramed change, such as the selection of a channel, generates a signal representing the desired position of the antenna on line 20, typically a voltage signal generated by a potentiometer, which is received by a voltage comparator 22. This device may typically be a bistable voltage comparator integrated circuit. A rotor position sensing signal source 24 generates a signal representing the actual position of the antenna on line 26, again, typically a voltage signal generated by a potentiometer. Said actual position signal is also received by the bistable comparator 22. The output of comparator 22 on lines 28 and 29 is either "high" or "low" depending upon the relative differences between the desired position signal and the actual position signal. For example, if the desired position signal voltage is greater than the actual position signal voltage, the position comparator signal will be of a first state. If the desired position signal voltage is not greater than the actual position signal voltage, the position comparator signal will be of a second state. When the two signals become equal, the position comparator signal will change state. The state of the position comparator signal is sensed by a bistable switching device, such as a relay 34, which sets said relay 34 to one of two states and thereby determines the direction in which the antenna rotor drive motor 76 will turn when energized.

A start pulse source 40 generates a start pulse on line 42, said pulse being in a predetermined delayed time relationship with the signal from the desired position signal source 10. The start pulse is compatible with and energizes an antenna rotor power signal means which may include, for example, a dual D-type, low power Schottky, edge-triggered flip-flop 48. In operation the start pulse source 40 generates a high-to-low-to-high start pulse to set the edge triggered flip-flops 48, which causes a rotor energization signal on line 50 to go high (or low). The state of the antenna rotor energization signal is sensed by a bistable switching device, such as power relay 64. The power relay 64 closes and opens in response to the rotor energization signal and applies power from an antenna rotor drive power source 60 through any necessary rotor power circuitry, such as rotor power transformer 68, and through the relay 34, for application to an antenna rotor drive motor 76 for rotation of an antenna shaft 78 and an antenna 79 attached thereto, in the desired direction to the desired position. The antenna rotor drive motor 76 and the rotor position sensing signal source 24 may be included as elements of a rotor assembly 77.

As the antenna shaft changes position, the rotor position sensing signal source 24 changes the actual position signal on line 26. As previously described, when the actual position signal and desired position signal are equal, the position comparator signal on lines 28 and 29 changes state. Said change of state, from "high" to "low" or vice-versa, causes the flip-flops 48 to change state and changes the state of the signal on line 50. This opens the power relay 64, interrupting the rotor drive power and causing the rotor drive motor 76 to stop the antenna in the desired position.

Figure 2:
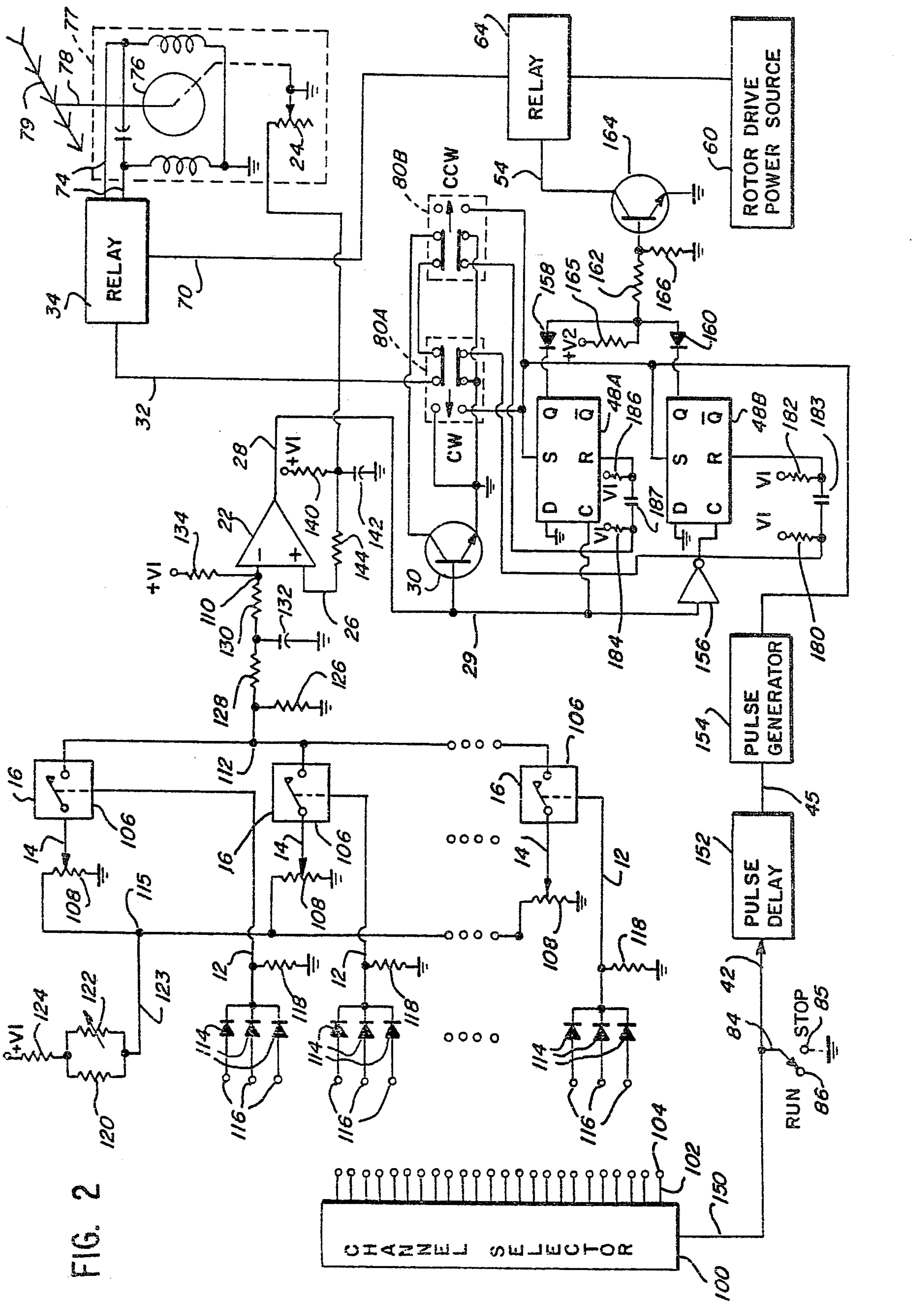
FIG. 2 is a diagram showing in greater detail an apparatus of FIG. 1 and including additional desired position signal means and manual antenna rotor control means.

The circuit of FIG. 2 generates the desired position signal at the inverting input of comparator 22. Channel selector 100 has a plurality of channel select lines 104 which are normally in the "low" state. When a valid channel is selected, a channel select signal 102 corresponding to the chosen channel goes from "high" to "low". Said channel select signal may be generated in any of several manners, all of which are well known in the art. Jumper wires are provided for the user to connect each channel selector output terminal 104 to a terminal 116 corresponding to a desired discrete antenna position. Any time the output 102 of channel selector 100 is high it applies a positive potential through its corresponding jumper wire and a diode 114 to the control input of the corresponding analog bilateral switch 106 via line 12. Circuit point 115 is coupled to the first positive potential source V1 through the variable voltage divider network of resistors 120, 124 and variable resistor 122. Circuit point 115 is also connected to a plurality of potentiometers 108. Potentiometers 108 provide a plurality of preselected voltages, each one corresponding to a desired antenna position. Each one may be set to correspond to a different antenna position, thereby providing any number of desired antenna position voltages. The wiper arm 14 of each potentiometer 108 is connected to an individual bilateral switch 16, which closes to pass the potential developed across wiper arm 14 to circuit point 112. The bilateral switches 16 respond to a "high" signal on line 12 originating at channel selector 100 by closing; they respond to a "low" signal on line 12 by opening. Closing switch 16 couples the potential developed at the wiper arm 14 of an associated potentiometer 108 through circuit point 112 and through the low pass filter of resistor 128 and capacitor 132 to the inverting input of comparator 22. The network of resistor 120, 122, and 124 provides a means for adjusting the maximum desired position signal potential. Specifically, variable resistor 122 is adjusted so that the maximum potential at circuit point 110 corresponds to the maximum potential of the actual position signals at one end of rotation of the antenna 79.

In order to provide the actual position signal, potentiometer 24 is provided having its wiper arm at circuit ground and mechanically coupled to antenna shaft 78 so that the wiper arm rotates with the antenna shaft. One end of the resistance element of potentiometer 24 is unconnected and is coupled to the first positive potential source V1 through a resistor 140 to define a voltage divider. The midpoint of that voltage divider is coupled through a low pass filter including a capacitor 142 coupled to ground and a resistor 144 to the noninverting input of comparator 22. The output of comparator 22 is connected through a drive transistor 30 and passed through manual counterclockwise rotation switch 80B, through manual clockwise rotation switch 80A, on line 32 to single pole, double throw relay 34. Relay 34 is connected such that a.c. power is applied thereto on an input 70 and is applied through either one of lines 74A or 74B depending on the state of the relay 34 and thus the state of the output of comparator 22, to the respective windings of the rotor drive motor 76. The motor 76 is such that its direction of rotation is determined by the winding to which the a.c. power is applied. As will be apparent, when the potential of the actual position signal at the noninverting input to comparator 22 exceeds the potential of the desired position signal at the inverting input thereto, the output of comparator 22 will be high causing rotation of antenna 79 in one direction, but when the opposite condition exists, the output of comparator 22 will be low causing rotation of antenna 79 in the opposite direction.

Certain constraints on the degree of rotor rotation may be desirable to prevent damage to collateral equipment, such as lead-in wires. The rotor assembly 77 has physical restraints which prevent it from rotating past a rotation reference position from either direction. Potentiometer 24 is ganged to antenna shaft 78 so that the maximum and minimum voltage outputs on line 26 correspond to the physical limits of the angular orientation of antenna shaft 78. The system is calibrated by first placing the antenna shaft 78 at the rotation reference position providing the maximum voltage on line 26 to the noninverting input of comparator 22. Variable resistor 122 is then adjusted so that the maximum voltage applied to the inverting input of comparator 22 via any potentiometer 108 equals the maximum voltage applied to the noninverting input of comparator 22 by the potentiometer 24. Accordingly, the rotor will stop when it reaches this reference position because the desired position signal and actual position signal will be equal. As will be apparent to one skilled in the art, the angle of rotation may be expanded or constricted by utilizing potentiometers with a varying number or degree of turns from maximum to minimum resistance. The physical restraints may also be adjusted or varied accordingly.

The channel selector 100 also includes an output 150 which generates a pulse every time the channel selected thereby is changed. That pulse is applied through a pulse delay circuit 152 to pulse generator 154. The pulse delay circuit introduces a sufficient delay after channel selection that the antenna rotator will not attempt to adjust itself to the position corresponding to the intermediate channels as the channel selector 100 is stepping from channel to channel to get from the previously selected channel to the newly selected channel. Pulse generator 154 merely squares up and puts the output of the pulse delay circuit 152 in proper form. The output of pulse generator 154 is normally high and temporarily goes low upon a change in channel. That output is coupled to the set inputs of two edge triggered, D type flip-flops 48A and 48B. The output of comparator 22 is coupled to the clock input of flip-flop 48A and through an invertr 156 to the clock input of flip-flop 48B. The data inputs of flip-flops 48A and 48B are both coupled to circuit ground. The Q outputs of flip-flops 48A and 48B are coupled to the cathodes of diodes 158 and 160, respectively, each of which has its anode coupled through a resistor 162 to the base of a PNP transistor 164. The anodes of diodes 158 and 160 are jointly coupled to a second positive supply potential V2 through a resistor 165. The base of transistor 164 is coupled to ground through a resistor 166 while the emitter thereof is coupled directly to ground and the collector is coupled to a single pole, single throw relay 64. Relay 64 is coupled between the rotor drive power source 60 and relay 34 and is such that when transistor 164 is conductive, power is supplied from source 60 to relay 34 whereas when transistor 164 is nonconductive, no such power is supplied.

Whenever the channel of channel selector 100 is changed, the leading edge of the high-to-low-to-high transition of the output of pulse generator 154 is operative to set both flip-flops 48A and 48B and cause their Q outputs to be high. Sufficient current is then applied to the base of transistor 164 to cause it to be conductive. The antenna 78 is then rotated in the direction determined by the output of comparator 22. Further, the circuit constants are chosen so that the trailing edge of the output of pulse generator 154 is applied to the set inputs of flip-flops 48A and 48B after the output of comparator 22 has changed to the state required because of the new potential of the desired position signal. When the antenna is rotated to the new desired position, the output of comparator 22 will change states, either from low to high or from high to low. If the change is from low to high, that change is applied to clock input of flip-flop 48A which, because the data input thereof is at circuit ground, causes the Q output to go low. With that Q output low, some of the current flow from the second positive potential source +V2 is diverted through diode 158 from the base of transistor 164 and insufficient current is then supplied to that base to cause the transistor to remain conductive. Thus, the transistor becomes nonconductive, relay 64 opens, and power is removed from the antenna rotor motor 76. Similarly, if the change in the output of comparator 22 is from high to low, a low to high change is applied by inverter 156 to the clock input of flip-flop 48B which also results in a removal of the power from the antenna rotor motor 76 in a manner similar to that just described.

A manual switching network 80A and 80B may be provided to apply the proper signals to relay 34 and flip-flops 48A and 48B to manually start rotation in the desired direction by placing relay 34 in the proper state and supplying a high to low transition to the set inputs of flip-flops 48A and 48B. By moving either switch 80A or 80B in the direction of the arrow shown, the set inputs of flip-flops 48A and 48B are connected to ground providing a high to low transition and causing Q to go high, which allows transistor 164 to conduct and close relay 64 to energize the rotor. To stop rotation when desired, a high-to-low-to-high pulse is then applied by means of the capacitor/resistor differentiator networks to the reset input of either flip-flop. Said differentiator network comprise resistors 180 and 182 connected to voltage potential V1 with capacitor 183 connected between resistors 180 and 182; and resistors 184 and 186 connected to voltage potential V1 with capacitor 187 connected between resistors 184 and 186. By moving either switch 80A or 80B to its original rest position (shown), the reset input of flip-flop 48A or 48B is supplied with a high-to-low-to-high pulse whch causes Q to go low, opening relay 64 through transistor 164.

While the preferred embodiment has been described using specific terms, such description is for illustrative purposes only, and it is to be understood that changes and variations may be made without departing from the spirit and scope of the following claims.

What is claimed is:

1. A system for rotating an antenna rotor shaft to a predetermined angular position for use with a radio wave receiver utilizing predetermined channels and having means for selecting one of said predetermined channels, said antenna rotating system including:

a. rotor drive means for angularly positioning said antenna shaft;
b. antenna rotor position sensing signal source means for generating a variable analog actual position signal, said position source means being responsive to the relative angular position of said shaft;
c. channel selection source means for producing a channel selection signal, said channel selection source means being responsive to a selection of one of a plurality of predetermined channels on said receiver and producing a discrete channel selection signal for each channel selected;
d. desired antenna rotor position signal source means for producing one of a plurality of preselected desired analog antenna position signals in response to one of said discrete channel selection signals, said desired signal means including
1. a plurality of selectively variable analog signal generators for generating at least one desired position signal for each different desired rotor position, and
2. a desired position switching means for each desired position generator, said switching means being responsive to said discrete channel selection signal;
e. position comparator means for providing a position comparator signal, said position comparator means being responsive to said actual position signal and said desired position signal and providing a continuous output signal from the time said actual position and desired position signals are applied thereto until said actual position and desired position signals are equal;
f. direction control means for effecting directional control of said rotor drive means, said directional control means being responsive to said position comparator output signal;
g. start pulse source means for generating an initial start pulse, said start pulse source means being responsive to said channel selection signal;
h. start pulse delay means for producing a delayed start pulse, said delay means responsive to said initial start pulse; and
i. rotor power signal means for producing a rotor energization signal to activate said rotor drive means, said power signal means being responsive to said delayed start pulse and said position comparator signal;

whereby said antenna is rotated to a desired position from an actual position in response to a selection of one of said channels of said radio wave receiver without further attention by the user or viewer thereof.

2. The system as claimed in claim 1 wherein said position source means comprises a variable voltage divider network including a potentiometer responsive to the position of said antenna rotor.

3. The system as claimed in claim 1 wherein said channel selection signal source means comprises a television or radio channel selector.

4. The system as claimed in claim 1 wherein said position comparator means comprises circuitry which provides a position comparator signal of a first state when said actual position signal is greater than said desired position signal, and provides a position comparator signal of a second state when said actual rotor position signal is not greater than said desired position signal, and changes state when said actual rotor position signal equals said desired position signal.

5. The system as set forth in claim 1 wherein said desired position switching means includes at least one bilateral switch.

6. The system as set forth in claim 1 wherein said antenna rotor power signal means includes:

a. rotor power logic means for proucing a power logic signal, said power logic means being responsive to said start pulse and said position comparator signal; and
b. rotor power source means for producing said rotor energization signal, said rotor power source means being responsive to said rotor power logic signal.

7. The system as set forth in claim 6 wherein said antenna rotor power source means includes:

a. rotor power switch means for switching said rotor energization signal, said rotor power switch means being responsive to said power logic signal; and
b. a rotor power source for generating said rotor energization signal.

8. The system as set forth in claim 1 further comprising direction control means responsive to a manual direction control signal.

9. The system as set forth in claim 8 further comprising rotor power signal means responsive to a manual power control signal.

10. The system as set forth in claim 9 further comprising manual rotor position control means for producing a manual direction control signal and a manual power control signal, said manual control means responsive to manual operation.

11. The system as set forth in claim 6 wherein said rotor power logic means includes two flip-flops.

12. The system as claimed in claim 1 wherein said actual position signal is an analog voltage.

* * * * *